United States Patent
Karas

(10) Patent No.: US 12,095,739 B2
(45) Date of Patent: Sep. 17, 2024

(54) DATA MANAGEMENT SYSTEM FOR NETWORKED ENDPOINTS

(71) Applicant: The Government of the United States of America, as represented by the Secretary of Homeland Security, Washington, DC (US)

(72) Inventor: Michael Karas, Fairfax Station, VA (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/383,376

(22) Filed: Oct. 24, 2023

(65) Prior Publication Data
US 2024/0163251 A1    May 16, 2024

Related U.S. Application Data

(60) Provisional application No. 63/425,390, filed on Nov. 15, 2022.

(51) Int. Cl.
*H04L 9/40* (2022.01)
*H04L 9/08* (2006.01)
(Continued)

(52) U.S. Cl.
CPC .......... *H04L 63/0272* (2013.01); *H04L 9/088* (2013.01); *H04L 9/30* (2013.01); *H04L 9/3247* (2013.01); *H04L 63/0236* (2013.01); *H04L 63/029* (2013.01); *H04L 63/101* (2013.01); *H04L 63/102* (2013.01); *H04L 63/1425* (2013.01); *H04L 63/1433* (2013.01)

(58) Field of Classification Search
CPC ............... H04L 63/0236; H04L 63/102; H04L 63/1425; H04L 65/1069; H04L 63/10; H04L 63/02; H04W 76/10; H04W 12/08
See application file for complete search history.

(56) References Cited

U.S. PATENT DOCUMENTS 7,440,544 B2    10/2008    Scheinman et al.
8,600,149 B2    12/2013    Song et al.
(Continued)

OTHER PUBLICATIONS

Bi et al., "A Secure and Efficient Two-Party Protocol Enabling Ownership Transfer of RFID Objects," IEEE Internet of Things Journal Year: 2023 | vol. 10, Issue: 18 | Journal Article | Publisher: IEEE.*

(Continued)

*Primary Examiner* — Roderick Tolentino
(74) *Attorney, Agent, or Firm* — Lavanya Ratnam; Robert W. Busby; William Washington

(57) ABSTRACT

A system and method for securely exchanging information between a server and an endpoint. A firewall and switch may administer connections between the endpoint and the server. The network interface of the server may send and receive information through the firewall and switch. A program task in the sever may set the network interface to be in an "on state" for a predetermined amount of time on a specific date thereby creating an active time transfer window that the network interface can receive communications from the endpoint.

15 Claims, 7 Drawing Sheets

(51) Int. Cl.
    *H04L 9/30*     (2006.01)
    *H04L 9/32*     (2006.01)

(56) References Cited

U.S. PATENT DOCUMENTS

| | | | |
|---|---|---|---|
| 8,885,938 B2 | 11/2014 | Hong et al. | |
| 10,200,352 B2* | 2/2019 | Holmelin | H04L 63/08 |
| 10,656,953 B1 | 5/2020 | Vasudevan et al. | |
| 11,063,961 B1 | 7/2021 | Heydari | |
| 11,252,178 B1 | 2/2022 | Malveaux et al. | |
| 11,310,719 B1 | 4/2022 | Boschulte et al. | |
| 2002/0174228 A1* | 11/2002 | Kanemaki | H04L 69/329 709/226 |
| 2007/0168467 A1 | 7/2007 | Hu et al. | |
| 2009/0106275 A1 | 4/2009 | Zhang | |
| 2013/0212195 A1* | 8/2013 | Bonefas | H04L 67/565 709/206 |
| 2016/0021507 A1 | 1/2016 | Gaines | |
| 2016/0315920 A1 | 10/2016 | Kurmala et al. | |
| 2017/0017777 A1* | 1/2017 | Manago | G06F 21/34 |
| 2017/0339253 A1* | 11/2017 | Pathak | H04L 67/142 |
| 2018/0107752 A1* | 4/2018 | Elez | G06F 16/2379 |
| 2018/0159701 A1 | 6/2018 | Krause et al. | |
| 2018/0205652 A1* | 7/2018 | Saxena | H04L 61/2557 |
| 2018/0234437 A1 | 8/2018 | McGaughey et al. | |
| 2018/0343236 A1* | 11/2018 | Pillay-Esnault | H04L 63/20 |
| 2020/0106743 A1 | 4/2020 | Park et al. | |
| 2021/0218551 A1* | 7/2021 | Moriarty | H04L 63/20 |
| 2022/0092442 A1 | 3/2022 | Sefair Cristancho et al. | |
| 2022/0345483 A1 | 10/2022 | Shua | |
| 2023/0010082 A1 | 1/2023 | Gabriner et al. | |
| 2023/0239692 A1 | 7/2023 | Paczkowski et al. | |
| 2023/0269160 A1* | 8/2023 | Mineikis | H04L 63/0464 |
| 2023/0367609 A1 | 11/2023 | Modesitt et al. | |

OTHER PUBLICATIONS

Ning, et al., "A Novel Bilateral Oblivious Transfer Protocol Based on Cut-and-Choose Technique," 2020 IEEE 14th International Conference on Big Data Science and Engineering (BigDataSE) Year: 2020 | Conference Paper | Publisher: IEEE.*

What is a computer port? Ports in networking, https://www.cloudflare.com/learning/network-layer/what-is-a-computer/, downloaded on Jul. 18, 2023.

List of TCP and UDP port numbers, Wikipedia, https://en.wikipedia.org/wiki/List_of_TCP_and_UDP_port_numbers, downloaded Oct. 4, 2023.

* cited by examiner

DATA MANAGEMENT SYSTEM FOR NETWORKED ENDPOINTS

CROSS-REFERENCES

This application claims priority to U.S. Provisional Patent Application No. 63/425,390 filed Nov. 15, 2022 incorporated by reference in its entirety.

STATEMENT OF GOVERNMENT INTEREST

The present invention was made by employees of the United States Department of Homeland Security in the performance of their official duties.

FIELD

The discussion below relates to generally to a secure communication protocol between an endpoint and a server.

BACKGROUND

This section provides a brief introduction to the technical subject matter without distinguishing what aspects of the technology are or are not in the prior art. Nothing in this section amounts to an admission regarding the prior art.

An example of a port is a virtual point where network connections start and end. Ports are software-based and managed by a computer's operating system. Each port is associated with a specific process or service. Ports allow computers to easily differentiate between different kinds of traffic: emails go to a different port than webpages, for instance, even though both reach a computer over the same Internet connection.

Port Numbers

Ports are standardized across all network-connected devices, with each port assigned a number. Most ports are reserved for certain protocols—for example, all Hypertext Transfer Protocol (HTTP) messages go to port 80. While IP addresses enable messages to go to and from specific devices, port numbers allow targeting of specific services or applications within those devices.

Efficiency for Ports in Networks

Vastly different types of data flow to and from a computer over the same network connection. The use of ports helps computers understand what to do with the data they receive.

Ports in Network Layers

The OSI model is a conceptual model of how the Internet works. It divides different Internet services and processes into 7 layers. These layers are: Application Layer (human computer interaction layer, where applications can access network servicers), Presentation Layer, Session Layer, Transport Layer, Network Layer, Datalink Layer, and Physical Layer.

Ports are a transport layer (layer 4) concept. A transport protocol such as the Transmission Control Protocol (TCP) or User Datagram Protocol (UDP) can indicate which port a packet should go to. TCP and UDP headers have a section for indicating port numbers. Network layer protocols—for instance, the Internet Protocol (IP)—are unaware of what port is in use in a given network connection. In a standard IP header, there is no place to indicate which port the data packet should go to. IP headers only indicate the destination IP address, not the port number at that IP address.

Usually, the inability to indicate the port at the network layer has no impact on networking processes, since network layer protocols are almost always used in conjunction with a transport layer protocol. However, this does impact the functionality of testing software, which is software that "pings" IP addresses using Internet Control Message Protocol (ICMP) packets. ICMP is a network layer protocol that can ping networked devices—but without the ability to ping specific ports, network administrators cannot test specific services within those devices.

Blocking Specific Ports with a Firewall

A firewall is a security system that blocks or allows network traffic based on a set of security rules. Firewalls usually sit between a trusted network and an untrusted network; often the untrusted network is the Internet. For example, office networks often use a firewall to protect their network from online threats.

Some attackers try to send malicious traffic to random ports in the hopes that those ports have been left "open," meaning they are able to receive traffic. This action is somewhat like a car thief walking down the street and trying the doors of parked vehicles, hoping one of them is unlocked. For this reason, firewalls may be configured to block network traffic directed at most of the available ports. Most "open" computer port do not have a reason to stay open to receive any traffic.

Firewalls are commonly configured to block traffic to all ports by default except for a few predetermined ports known to be in common use. For instance, a corporate firewall could leave open ports 25 (email), 80 (web traffic), 443 (web traffic), and a few others, allowing internal employees to use these essential services, then block the rest of the 65,000+ ports.

Examples of Port Numbers

There are 65,535 possible port numbers, although not all are in common use. Some of the most commonly used ports ("standard ports"), along with their associated networking protocol, are:

a. Ports 20 and 21: File Transfer Protocol (FTP). FTP is for transferring files between a client and a server.

b. Port 22: Secure Shell (SSH). SSH is one of many tunneling protocols that create secure network connections.

c. Port 25: Historically, Simple Mail Transfer Protocol (SMTP). SMTP is used for email.

d. Port 53: Domain Name System (DNS). DNS is an essential process for the modern Internet; it matches human-readable domain names to machine-readable IP addresses, enabling users to load websites and applications without memorizing a long list of IP addresses.

e. Port 80: Hypertext Transfer Protocol (HTTP). HTTP is the protocol that makes the World Wide Web possible.

f. Port 123: Network Time Protocol (NTP). NTP allows computer clocks to sync with each other, a process that is essential for encryption.

g. Port 179: Border Gateway Protocol (BGP). BGP is essential for establishing efficient routes between the large networks that make up the Internet (these large networks are called autonomous systems). Autonomous systems use BGP to broadcast which IP addresses they control.

h. Port 443: HTTP Secure (HTTPS). HTTPS is the secure and encrypted version of HTTP. All HTTPS web traffic goes to port 443. Network services that use HTTPS for encryption, such as DNS over HTTPS, also connect at this port.

i. Port 500: Internet Security Association and Key Management Protocol (ISAKMP), which is part of the process of setting up secure IPsec connections.
j. Port 587: Modern, secure SMTP that uses encryption.
k. Port 3389: Remote Desktop Protocol (RDP). RDP enables users to remotely connect to their desktop computers from another device.

The Internet Assigned Numbers Authority (TANA) maintains the full list of port numbers and protocols assigned to them. Additionally, there is a table at the end of the specification that defines all "standard ports."

U.S. Pat. No. 7,440,544 incorporated by reference in its entirety relates to a system and method for baggage screening at security checkpoints. A CT scanner system processes x-ray data to locate and eliminate non-contraband without a full CT reconstruction of the entire bag. The CT scanner system utilizes lineogram data to disqualify objects of insufficient size, density, or mass as potential threats.

U.S. Pat. No. 8,600,149 incorporated by reference in its entirety relates to a method and system of electronically inspecting baggage comprises generating scan data representative of a piece of baggage. At least one of a contour and a surface is extracted from the scan data, and the at least one of a contour and a surface is representative of an object within the baggage.

U.S. Pat. No. 8,885,938 incorporated by reference in its entirety relates to potential threat items may be concealed inside objects, such as portable electronic devices, that are subject to imaging for example, at a security checkpoint. Data from an imaged object can be compared to predetermined object data to determine a class for the imaged object. Further, an object can be identified inside a container (e.g., a laptop inside luggage).

SUMMARY

One configuration of the present invention may relate to a system comprising a network, server, and an endpoint. The server comprising a time window generator configured to generate a window. The server comprising a timing circuit configured to cause a network interface to connect the server to the network. The network interface comprising a port configured to receive a data packet from the endpoint within a time window. The data packet comprising an endpoint identity. The server comprising an ID verification module configured to determine whether the identity of the endpoint is an approved identity. If the identity is approved, the server may store and/or process information from the endpoint.

Another configuration of the present invention may relate to a system comprising: a first endpoint comprising an endpoint network interface having a timing circuit; an endpoint timing circuit configured to control timing for the network interface of the endpoint; a server comprising a server network interface having a timing circuit; server timing circuit configured to control timing for the network interface of the server; and the server and endpoint forming a secure network.

Another configuration of the present invention may relate to a server configured to send a connection packet to an endpoint to establish communications at a future time through a network. The connection packet may comprise a next IP address, a next IP Port, a next connection time, and a next connection date. The connecting packet may provide instructions to the endpoint as to when and how to send information from the endpoint to the server. The server may comprise a network interface to connect the server to the network.

Another configuration of the present invention may relate to a method of transferring data on a secure network. The method may comprise generating an ID associated with an endpoint. A data packet generator may be configured to generate a data packet. An endpoint may send a data packet at time T using port X with the ID. A network interface may switch into an active state during a time transfer window. The network interface may receive the ID and data packet while in the active state. The network interface may provide an ID verification module with the data packet and ID. The ID verification module may be configured to determine the endpoint is recognized or approved; and confirm the identity matches an entry on a whitelist of approved identities.

Another configuration of the present invention may relate to a system comprising: a plurality of endpoints connected to a local managed network switch; the plurality of endpoints may comprise a dedicated network interface; the dedicated network interface may have an online state and offline state; the dedicated network interface may be configured to utilize local TCP/IP address assignment. The endpoints may comprise a scanner zone; the scanner zone comprising a filing system for storing scan data in a database. A server may comprise: an ID verification module configured to restrict communications to only between the server and an individual, previously approved endpoint; a quarantine zone configured for each endpoint; the quarantine zone comprising a filing system for each endpoint; and a distribution zone configured to securely distribute files to the endpoints. The endpoints may be configured to securely copy data or files to the quarantine zone. A security key module may be configured to generate a unique public-private key pair for the SCP for each endpoint with the public key placed on the dedicated server and the private key on the endpoints. A firewall & switch may be configured to administer connections between the endpoints and the dedicated server. A managed network switch may be connected to at least one endpoint and the dedicated server through the firewall and switch.

Another configuration of the present invention may relate to a method of securely exchanging information between a server and an endpoint. The server may comprise a processor, memory, storage media, a network interface, and non-transitory software instructions configured to be executed by the processor. The endpoint may comprise a processor, memory, storage media, a network interface and non-transitory software instructions configured to be executed by the processor. The processor of the server may create a program task in the memory of the server. A firewall and switch may administer connections between the endpoint and the server. A network interface of the server may send and receive information through the firewall and switch. A program task may set the network interface to be in an "on state" for a predetermined amount of time on a specific date thereby creating an active time transfer window that the network interface can receive communications from the endpoint. The program task may set the network interface to be in an "off state" before and after the active time transfer window thereby blocking transmissions from the endpoint when the network interface is in the off state. A processor of the endpoint may create a program task in the memory of the endpoint. The program task of the endpoint may be configured to run at a random time within the active transfer window. The server may provide active transfer time window information to the endpoint. The endpoint program task may set the network interface to an up state. The endpoint may establish an encrypted VPN between the endpoint and the server. The endpoint may transfer information on a computer port.

Another configuration of the present invention may relate to a method securely exchanging information between a server and an endpoint. The server may comprise a processor, memory, storage media, a network interface, and non-transitory software instructions configured to be executed by the processor. The endpoint may comprise a processor, memory, storage media, a network interface and non-transitory software instructions configured to executed by the processor. The processor of the server may create a program task in the memory of the server. The program task in the server may switch the network interface of the server into an online mode. The server may receive a data packet from the endpoint when the network interface of the server is in online mode. The data packet may contain an ID and instructions. The server may verify the ID matches an ID from a list of approved IDs. The server may store instructions from the data packet in a quarantine zone. The server may process instructions in the file. The server may transmit a file back to the endpoint based on the instructions in the data packet.

DETAIL DESCRIPTIONS OF DRAWINGS

Server and Endpoint Architecture

Figure 1:
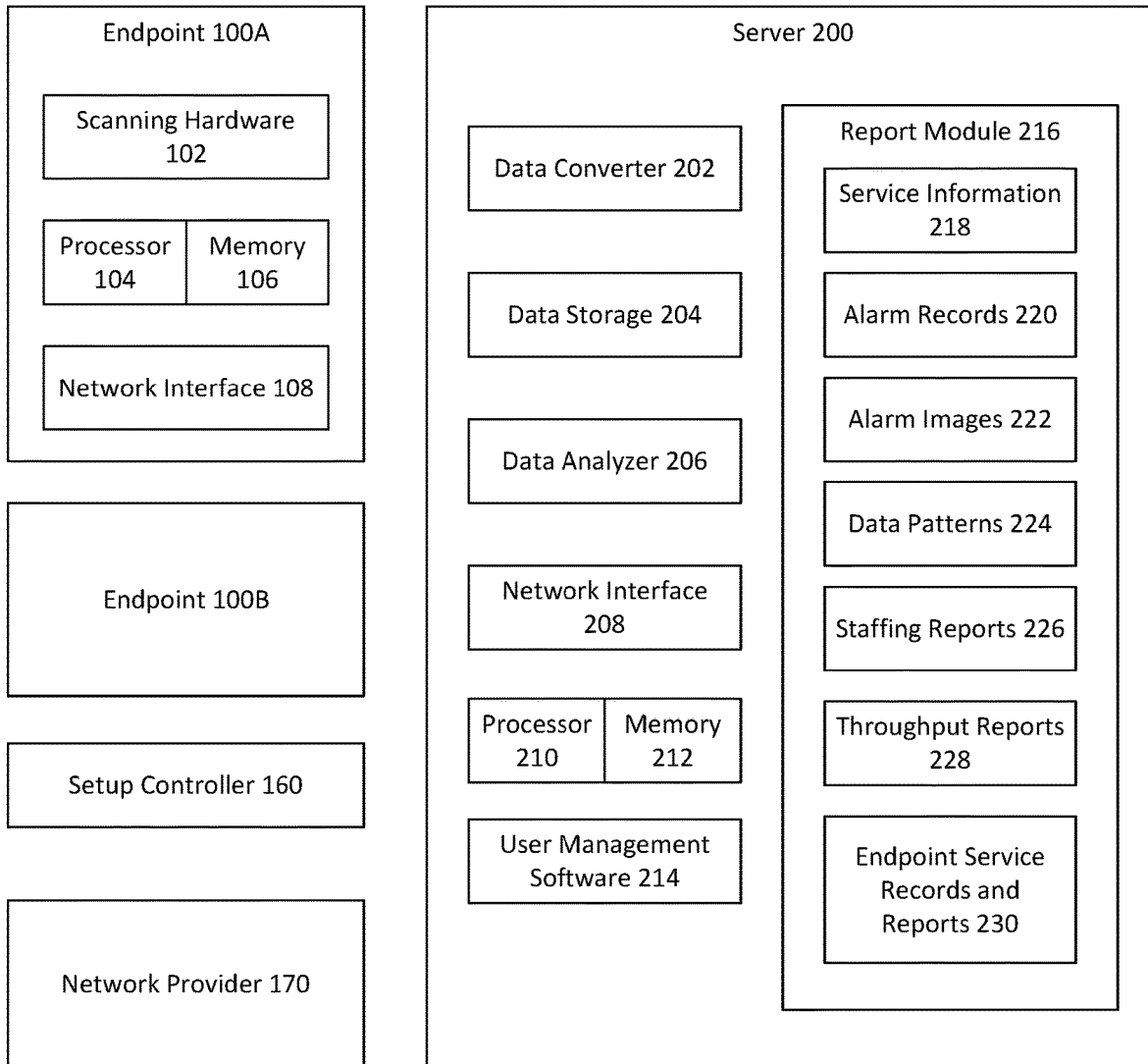
FIG. 1 is a schematic drawing of an endpoint, a network provider and a server.

FIG. 1 shows a system of two endpoints, setup controller, network provider and a server. The server may provide an exchange of information bidirectionally to and from the endpoints. A network provider 170 such as a router may provide a wired or wireless communication network for the endpoint and server to transfer information.

An endpoint is a machine configured to detect, scan, or obtain information. Detectors are examples of endpoints. Examples of detectors include X-ray machines, sound detectors, CT scanners, ultrasound scanners, radiation detectors, cameras, or other machine capable of detecting, scanning or obtaining information. A security detector is a detector designed be used as a security stop to detect the presence of target items (drugs, guns, knives, etc.) Detectors may generate records. Records may comprise metadata, image data, image analysis, and other information. A detector may comprise an alarm when it detects a target item. The detector may store an associated image of an item that caused the alarm. Examples of security detectors includes equipment like metal detectors, x-ray machines, and CT scanners. Security detectors are generally used in airports, secure buildings, military bases, and other areas that monitor what users bring into or out of a building or secure location. Detectors may output a status of a machine. The status may contain information such as runtime, IP address, software models, access logs, number of scans, etc.

FIG. 1 shows a first endpoint 100A and a second endpoint 100B. An endpoint may comprise scanning hardware 102, a processor 104, memory 106, and a network interface 108. The scanning hardware may be configured to scan a person or object to determine additional information about the object (for example whether the object contains a metallic object.)

A server 200 may comprise a data converter 202 configured to change data from the endpoint 100A from one format to another. The server 200 may also comprise a data storage 204 and data analyzer 206. The server may also comprise a network interface 208, processor 210, and memory 212. The server may comprise user management software 214 that may be stored in the memory and run by the processor for setting and adjusting user management rights.

The server 200 may comprise a report module 216. The report module may generate reports such as service information 218, alarm records 220, alarm images 222, data patterns 224, staffing reports 226, throughput reports 228, and endpoint service records and reports 230.

Endpoints may comprise a lot of important information such as scans of bags, rosters, number of people scanned, etc. For this reason, endpoints are often targets of hackers and various entities interested in accessing sensitive information. To improve the security and harden the system against hacking various security features to the system are disclosed.

Endpoint and Server System Architecture

Figure 2:
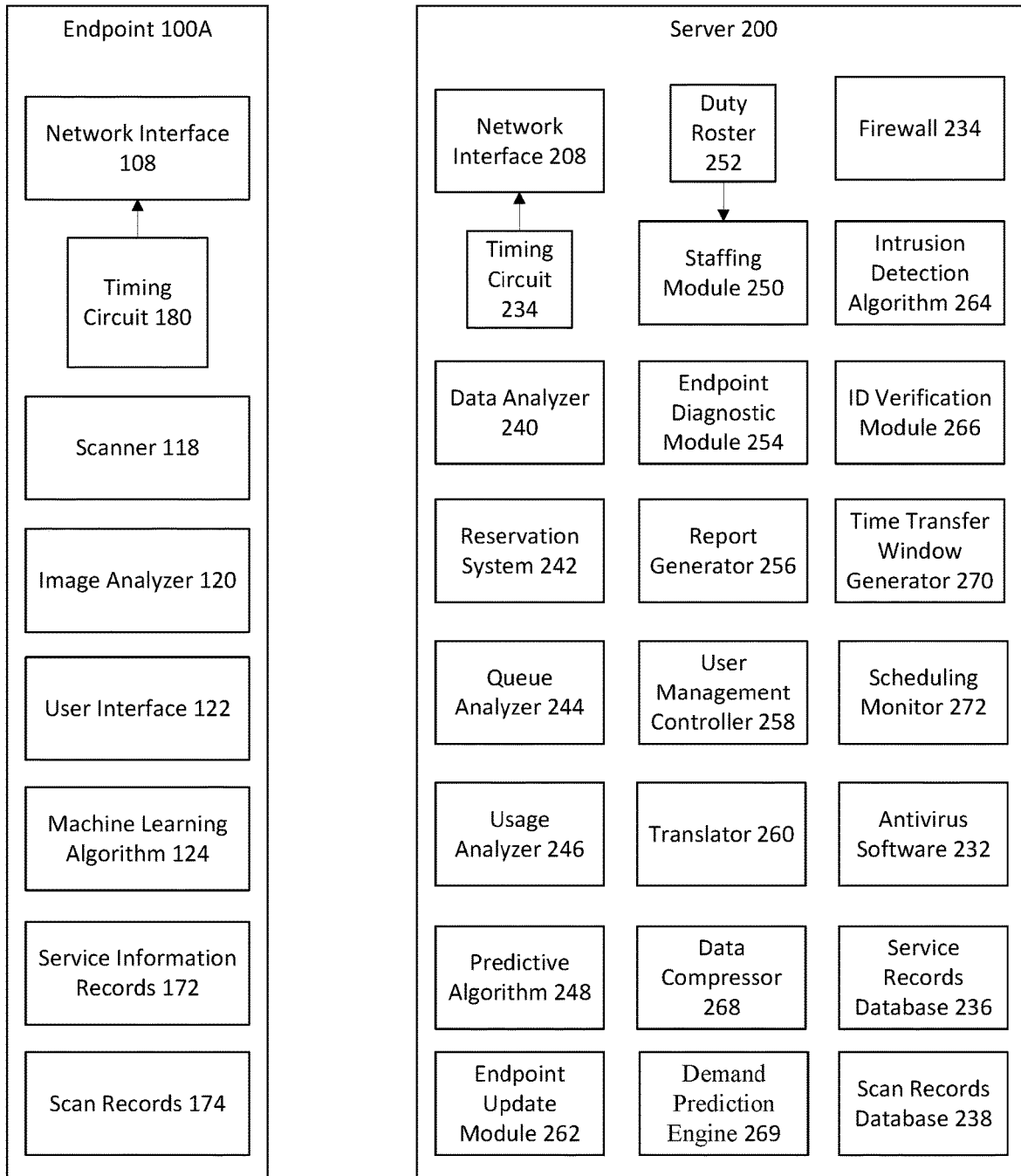
FIG. 2 shows a schematic of some of the programs and/or circuitry of the server and endpoint.

Referring to FIG. 2, the endpoint and the server may each comprise a network interface 108 having a timing circuit 180. The timing circuit may be configured to automatically turn on or turn off the network interface at preselected times. A server timing circuit 233 may control timing for the network interface 208 of the server 200. An endpoint timing circuit 180 may control timing for the network interface 108 of the endpoint 100A.

In some configurations, the endpoint timing circuit 180 may be set by a setup controller (see FIG. 1, 160). The setup controller 160 may be used when bringing a new endpoint into the system. The setup controller 160 may also be used when an endpoint has lost connectivity to the server 200 and/or server network. While shown in FIG. 1 as a separate component, the setup controller 160 may be integrated into the server or the endpoint. The network interface of the endpoint 108 or the network interface of the server 208 may be configured to automatically turn off after it has transmitted or received information.

The server may comprise antivirus software 232 to protect the server from software viruses. The server 200 may also comprise a firewall 234 with deep packet inspection. The server may comprise a VPN server and the endpoint may comprise a VPN client. The endpoint and server may comprise SCP, SFTP, and SSH software (SSH) for facilitating secure transmissions. The endpoint may comprise an operating system hardened to current STIG (Security Technical Implementation Guide) requirements.

The server may obtain service information records 172 from an endpoint. Service information may comprise maintenance requests, tolerances, belt tolerances, and scheduled repairs. The server may store the service information in a service records database 236.

An endpoint may store scan records 174 in a connected or integrated storage device or in the endpoint memory. The endpoint may transmit the scan records to the server 200. The server 200 may store the scan records in a scan records database 238. Scan information may comprise images, metadata, alarm information, date, location, time, suspected item, analysis data of the image, etc. The scan database and the service record database may be a single database in some configurations. The database may be integrated into the server 200 or it may be its own device. For example, a database may comprise a processor, memory, storage, network interface, and database management software configured to send, update, modify, transmit, and organize records. A database may be configured to process SQL commands and run database instruction sets.

Figure 3:
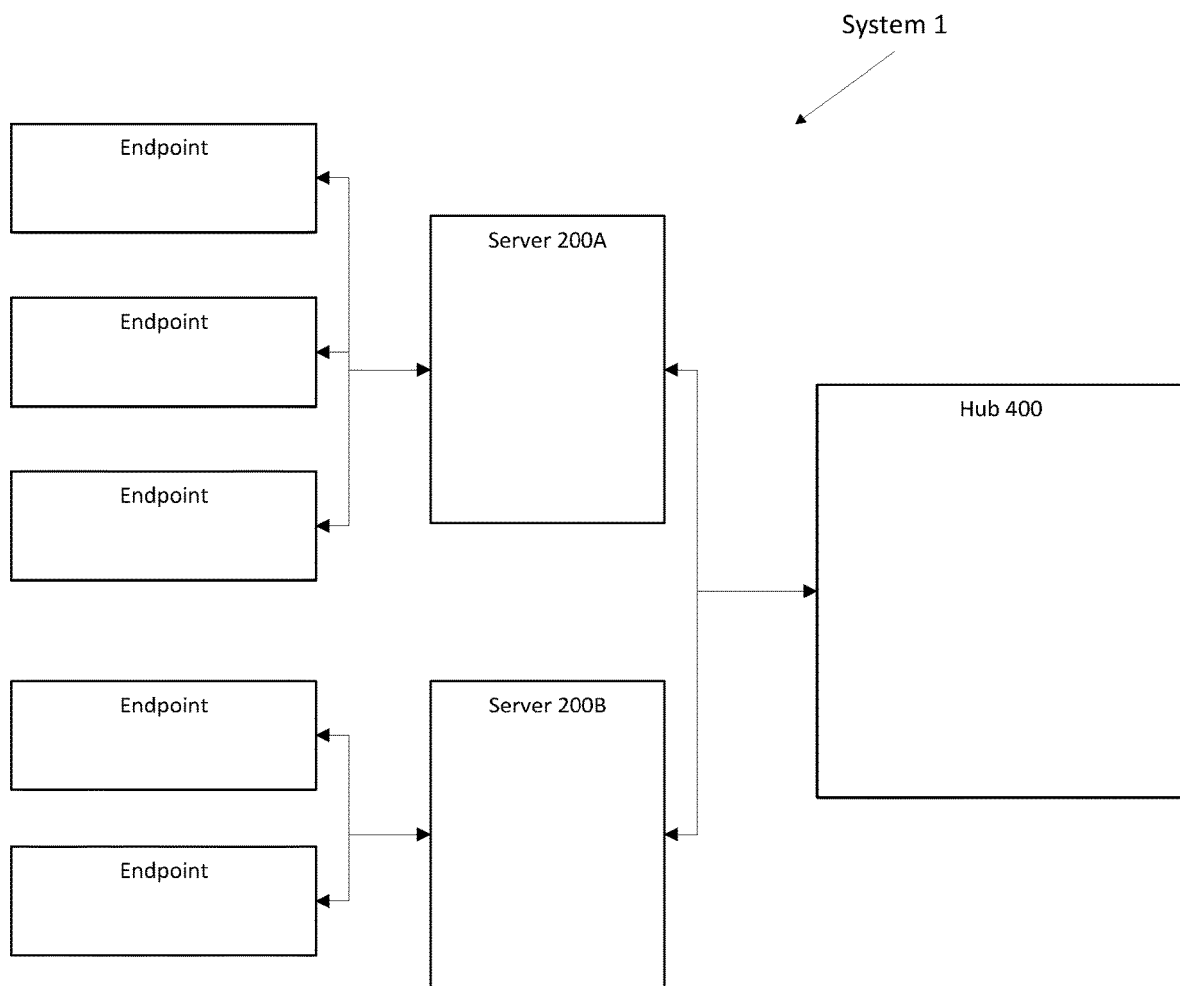
FIG. 3 shows how five endpoints, two servers, and a hub may be connected to send and receive information inside a system.

As shown in FIG. 3, the server may be connected to other servers (e.g., server 200A and server 200B). The architecture of a multi-server network may vary. For example, there may be a command center that controls or has access to the servers. A server may function in a distributed network with or without a central server. The server(s) may have various access level security to provide server operators with an appropriate of access to other servers and/or detectors. Server 200A and server 200B may also connect to a hub 400. A hub is a type of server configured to collect analyze data from one or more servers connected to one or more detectors. In FIG. 3, each of the servers is shown connected to multiple endpoints.

A server may comprise a data analyzer 240 (FIG. 2) programmed to run statistical analysis of information from one or more endpoints. The hub 400 may be configured to run statistical analysis on data from multiple servers. For example, the hub may be configured to analyze whether there is an increase in how many guns are being detected in a time period (like per hour or per day). A server could be configured to perform a similar analysis. In some configurations, a secure location (like a building, military base or airport) will have one or more servers connected to plurality of endpoints. A secure location may comprise a hub as well. The hub 400 may be configured to run statistical analysis on data from multiple servers; each of the servers comprising a data analyzer configured to run statistical analysis of information from one or more endpoints.

The server, endpoint, and/or hub may compose a system 1 (FIG. 3). The system may comprise: a reservation system containing reservations for people expected to enter or leave a location in a time window through an entrance or exit; a demand prediction engine 269 (FIG. 2) configured to determine or predict demand at one or more scanning locations; a queue analyzer configured to determine demand by analyzing video or photos of people waiting in a queue; a usage analyzer configured to analyze how many scans one or more endpoints has processed in a given time window on a given date; a predictive algorithm and logic to process data generated by the usage analyzer to predict how many scans a given endpoint will need to process in on a future date, day of the week, or calendar date in a future time window; a staffing module configured to update duty rosters to make more agents available to work at machines at times that have more people entering or leaving a building; the staffing module may be configured to analyze various data inputs such as the predictive algorithm, reservation system, queue analyzer, usage analyzer, etc. to predict what updates to make to the duty roster; the staffing module may be configured to requisition additional equipment to improve scan rate of people waiting in the queue.

Referring to FIG. 2, the server and/or hub may be configured to determine or predict demand at one or more scanning locations. The server and/or hub may be connected to a reservation system 242 which may contain reservations for people expected to enter or leave a location in a time window through an entrance/exit. The server and/or hub may comprise a queue analyzer 244 configured to determine demand by analyzing video and/or photos of cameras of queues. The server and/or hub may be equipped with a usage analyzer 246 configured to analyze how many scans one or more detector processed in a given time window on a given date. A predictive algorithm can process data generated by the usage analyzer 246 to predict how many scans a given endpoint may need to process in on a future date, day of the week, or calendar date in a future time window (e.g., 5-7 PM on Fridays.) A staffing module 250 may be configured to update duty rosters 252 so that more agents are available to staff machines at times that have more people entering or leaving a building. The staffing module 250 may analyze various data inputs such as the predictive algorithm, reservation system, queue analyzer, usage analyzer, etc. to predict what updates to make to the duty roster. The staffing module 250 may be configured to requisition additional equipment to aid in detecting such as a mobile scanner.

The server may comprise an endpoint diagnostic module 254. The endpoint diagnostic module 254 may be configured to generate and maintain records on service life, repairs, and costs for operating different types of endpoints or detectors. For example, the endpoint diagnostic module may be configured to generate reports on which brand of X-Ray machine has more error messages or which type of CT Scanners have more mechanical failures. The endpoint diagnostic module may be configured to generate cost to operate reports. Cost to operate reports may include energy costs, planned upgrades, planned and unplanned repairs, staffing costs, costs to acquire, etc.

A report generator 256 may comprise one or more data inputs. A data input may receive output from one or more components of the server 200. For example, the report generator 256 may receive data from the endpoint diagnostic module, staffing module, predictive algorithm, reservation system, queue analyzer, usage analyzer, etc. to generate useful reports. For example, an airline might requisition scan data from the usage analyzer 246 to determine how much overhead bin space is necessary for new airplanes based on how many bags and what size bags travelers bring onto planes.

The server 200 and/or hub 400 may comprise a user management controller 258 configured to setup user access on one or more endpoints or detectors. Conventionally, a system administrator would need to physically travel to a detector and set user permissions for the detector. For example, the system administrator might configure which agents can run or access an endpoint and at what times. The user management controller 258 may be configured to establish and/or change endpoint level access policies.

The server 200 may be configured with a translator 260 configured to standardize information from different endpoints into a standard format. For example, different endpoints might output a date using a different format Feb. 5, 2022 vs 20220205. The translator may be configured to homogenize data from different branded endpoints or differently configured endpoints so that data received from the endpoint may be processed by the server or hub.

The endpoint may be configured to take an image of an object near (e.g., within optical view of the scanner or camera) of the detector with a scanner or camera 118. The endpoint may comprise an image analyzer 120 configured to analyze the image for an object of interest. The image analyzer may comprise an algorithm to determine an interest level, a binary decision, or a probability that the image shows an object of interest. The endpoint may comprise a user interface 122 configured to receive an image identification and object status. The image identification may comprise a name or description of the scanned object. An object status may comprise a machine or human verified decision as to whether the object is an object of interest. The endpoint may comprise a machine learning algorithm 124 to improve its image analysis algorithm. The server or hub may aggregate data from many detectors to increase a sample size of object scans. The server or hub to generate improved algorithms for the image analyzer and update the detector with an improved algorithm.

The server or hub may comprise an endpoint update module 262 configured to install an improved image analyzer, timing circuit, or other software installed on the endpoint.

The server may comprise a network interface 208 comprising software to generate a rotating IP address. A rotating IP address is more difficult to hack because a hacker would need to first determine a current or future IP address of the server before attempting to connect to the server. The server 200 may be configured to randomly determine a next IP address or a next IP address may be selected from a predetermined sequence. A next IP address is the next IP address that the server will have when it connects to the internet for communication with other servers or endpoints. The server may also rotate the ports that the server will accept communications from endpoints. The server may use standard, nonstandard, and/or incongruent ports. The server may also specify a time window and date at which it will accept communications on a specific IP port.

Referring FIG. 2, the firewall and/or server may comprise an intrusion detection algorithm 264 configured to identify a rogue machine attempting to guess which port is open. The server 200 may also comprise an ID verification module 266 configured verify that the endpoint is on a whitelist or not on a blacklist.

Endpoint Server Connection Protocol

Figure 4:
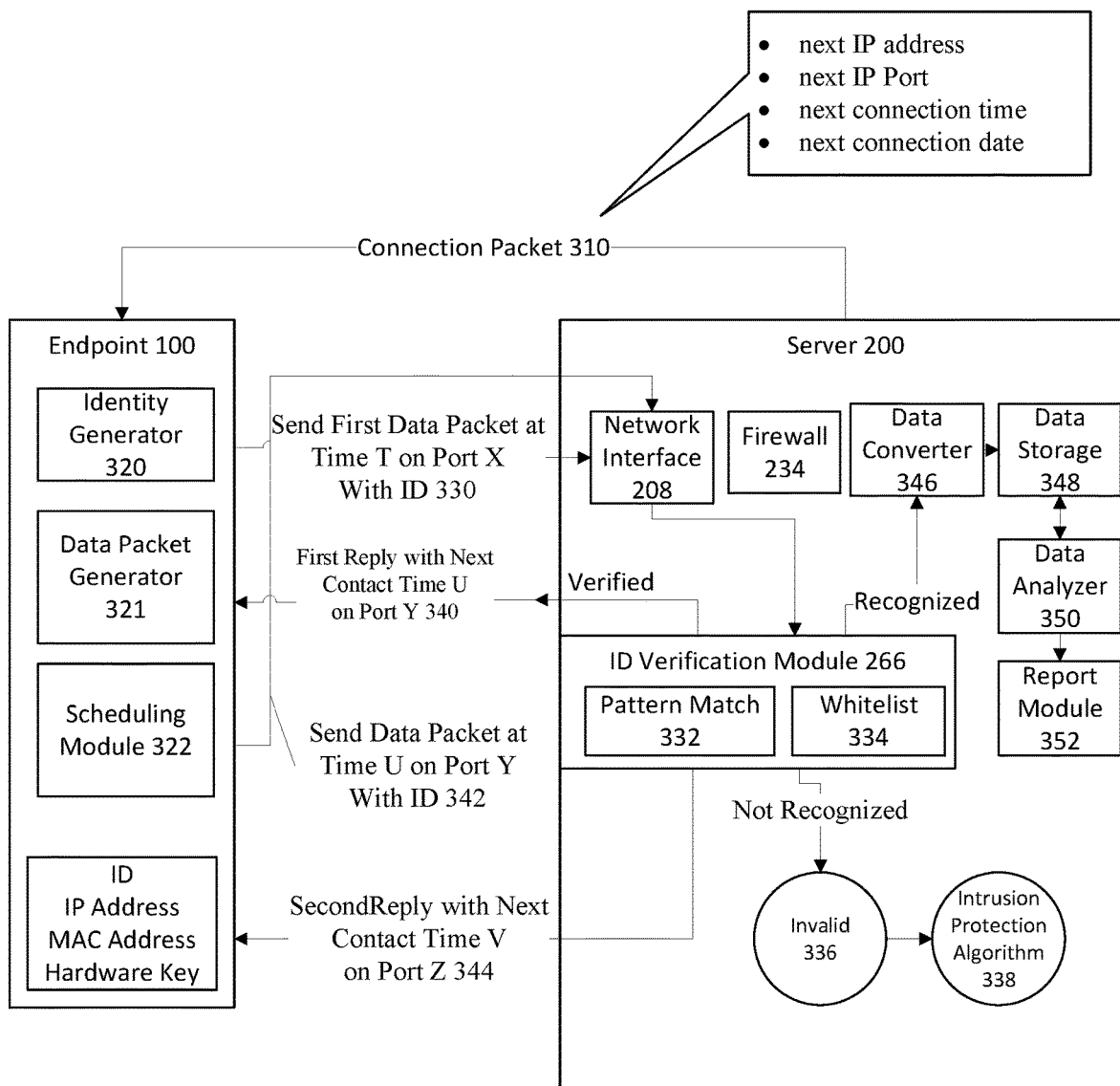
FIG. 4 shows a method of establishing a secure connection between an endpoint and a server.

As shown in FIG. 4, the server may send a connection packet 310 to one or more detectors so that the detectors can communicate with the server at a future time. The connection packet 310 may comprise a next IP address, a next IP Port, a next connection time, and a next connection date. In other words, the server 200 may instruct the endpoint 100 when and how to send its communication to the server. A firewall 312 in the server may be configured to keep ports closed other than the next port.

The endpoint may comprise an identity generator 320 configured to generate an identity (ID) using, for example, the IP address, Mac Address, passcode, username and password, a hardware key, or other features of the endpoint. The ID verification module (266, FIG. 2) may be configured to accept communications only from an endpoint with a specific identity such as the IP address. In some configurations, the endpoint may be configured to transmit a passcode to the server. The ID verification module 266 may be configured to delete, quarantine, or export data from an endpoint that fails an ID Verification. The server may trigger an alarm if an ID verification fails.

The system may be configured to provide secure transfer of data packets (upload and download) between endpoints and the server. The data packets may be any type of file in any format. The data packet may be limited in size based on network bandwidth considerations between the two devices and the time allotted to a "time transfer window" as described above. The data packet may include the connection packet. The endpoint and/or server may comprise a data compressor 268 configured to compress the data and/or "zip" the data. A time transfer window generator 270 may generate a time window comprising a date, start time and end time may be approximately 5 minutes, 10 minutes, 15 minutes, or 20 minutes in duration. The time window may be open daily, open on certain days of the week, or open on certain days of the month. A scheduling monitor 272 in the server 200 may be configured adjust the time window based on how many endpoints are scheduled to send data packets and size of recently received data packets. In some configurations, the time transfer window is configured to occur randomly for each individual endpoint. The server may configure the time window to be open just long enough to securely upload and download the data packet from the endpoint. As previously described, the server may also require a nonstandard SSH communications port (e.g., 9176) or utilize a rotating port to further harden the system.

Standard ports according to this application are ports that are regularly used for TCP and UDP communications. A list of standard ports appears at the end of the specification. For the purpose of this specification, all ports appearing the list of standard ports are "standard ports."

Nonstandard ports are ports that are not regularly used for TCP or UDP communications. Nonstandard ports are ports that do not appear in the list of standard ports (such as port number 996 is not in the list of standard ports). For the purpose of this specification, if a port does not appear in the list of standard ports, it is considered a nonstandard port.

An incongruent port can be a standard port or nonstandard port. It is a port used for a purpose other than what the standards protocol (Internet Assigned Numbers Authority (TANA)) dictates. For example, computers communicate via FTP on port 20. Sending HTTP information over port 20 (HTTP is usually port 80) is use of standard port in an incongruent manner.

FIG. 4 shows that the endpoint and server may be programmed to execute a secure data transfer algorithm. The identity generator may generate an ID as previously described. The endpoint 100 may send a data packet at time T on X with ID (330). The network interface 208 may receive the ID and transmit the entire message including the data packed to the ID verification module. The ID verification module may determine the endpoint is recognized or approved by confirming the identity matches (optionally using pattern matching 332) an entry in a whitelist 334 of approved identities. The ID verification module may determine the endpoint is not recognized/not approved by confirming the identity does match (optionally using pattern matching 332) an entry in a whitelist 334 of approved identities. In other configurations, the ID verification module might confirm that the identity matches an entry in blacklist of disapproved identities, in which case the endpoint is not approved. The server may transmit a reply back to the endpoint indicating that the server has determined the endpoint is not recognized/not authorized (invalid 336) to send information to the server and/or receive information from the server. The server may add the identity to the blacklist or execute other intrusion protection algorithms 338. In addition, the server may add the identity of an endpoint to the blacklist when the endpoint attempts a connection to the server outside a time-window or using the wrong port. While the server may be disconnected from the network outside the time-window, the switch may still remain active/online. The switch may be configured to transmit the identity of the endpoint connecting outside the time window to the server, allowing the server to add the identity of the endpoint to the blacklist.

A data packet generator 321 may be configured to generate a data packet. The data packet may contain data collected by an endpoint such as scans, detections, anomalies, software version numbers, operating conditions, etc. The data packet could contain any information that an endpoint might be programmed to collect. A data converter 346 may convert data from the endpoint into a universal format. Data collected by different model and brand endpoints might format data differently. Examples of different formats include: long form date versus short form date, different table delimiters, different types of white space, different data collections, fields comprising multiple fields in other reports, etc. The data converter 346 may be programmed to homogenize data from a plurality of different endpoints. The server may store the data in a data storage device 348 such as a database. A data analyzer 350 may analyze the homogenized data for patterns of interest, notifications, detections, etc. The data analyzer may comprise a report module 352 configured to output results from the analysis. Reports may include a display on a monitor including tables and charts, printing a report with a printer, emailing a report, uploading a report to database or shared drive, sending a link to a user to download a copy of the report, etc.

In process flows in which the ID verification module verifies that the identity of the endpoint matches an approved identity in the whitelist, the server may transmit a reply 340 containing a next contact time U and port Y. These instructions program a scheduling module 322 in the endpoint to instruct the endpoint to send its next message at time/date U using port Y. The endpoint next sends a second data packet at Time U on Port Y with ID 342. The server 200 may repeat this process by providing the endpoint with a second reply containing a next contact time V on Port Z. Time T, Time U, and Time V may be provided in different formats, and they may include a date and time. Time information may be sent in relative time (e.g., 1 day and 4 hours from now) or at a specific time & data (e.g., send the next packet at 2:00 PM EST, Jul. 17, 2023.)

Scheduled Operational Technology Data Exchange and Device Setup View

Figure 5:
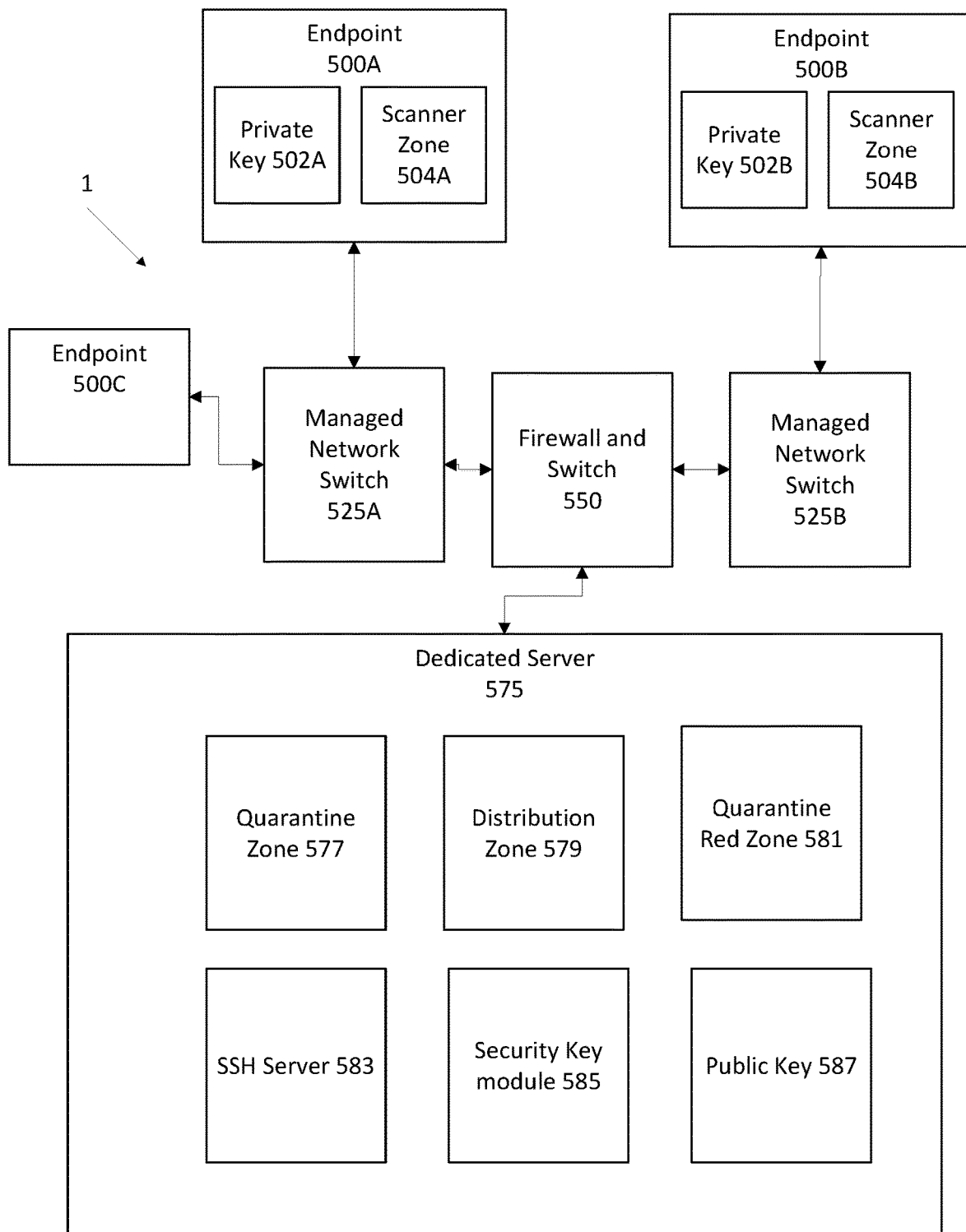
FIG. 5 illustrates a scheduled operational technology data exchange and device setup view.

FIG. 5 illustrated a scheduled operational technology data exchange and device setup view. Endpoint 500A, endpoint 500B, and endpoint 500C may comprise an OS hardened to current STIG requirements. Although the system 1 in FIG. 5 shows three endpoints, two managed network switches (525A and 525B), one firewall and switch 550, and one dedicated server 575, more or less of each components are possible and contemplated (e.g. three servers). The endpoint may be connected to a locally managed network switch using a network interface in the endpoint. In FIG. 5, managed network switch is connected to endpoints 500A and 500C, while endpoint 500B is connected by a second managed network switch 525B. Each CT scanner/endpoint may comprise a "scanner zone" (see elements 504A/504B). A scanner zone is a filing system for storing scan data in a database. A dedicated interface on the endpoint may be configured utilizing local TCP/IP (v4 or v6) IP address assignment. The operating system of the endpoint may be configured to only allow network traffic to/from IP address of the server and only on the SSH port specified on the sever.

The network interface on the endpoint may have an "up state", "on state", and/or "online state." Similarly, the dedicated network interface may comprise a "down state," "off state", or "offline state."

A security key module may generate a unique public/private key pair for the SCP for each CT scanner with the public key 587 being placed on the server and the private key on the individual CT scanner 502A (for endpoint 500A) and private key 502B (for endpoint 500B). The private keys (502A and 502B) may be different from one another. A private key may be placed on the individual CT scanner manually by loading the private encryption key onto the CT via a USB device (or portal storage device)—not via a network.

A managed network switch 525 may have a managed network interface. The network switch may comprise a managed network interface. The network interface may be comprise an online (up state) and offline state (down state). The endpoint may comprise subnet. A security operations center (SOC) may monitor the IP of the CT scanner. The security operations center may comprise an identity and access control policy platform configured to enforce compliance, enhance infrastructure security, and streamline service operations. The SOC may run CISCO ISE (Cisco Identity Services Engine) against the subnets for example.

A firewall & switch 550 may be configured to limit the connection from the CT scanner to the DS. The firewall & switch may be configured to provide redundancy, block chain control of network encryption keys, and support native IPv6. The firewall & switch may be configured to perform deep packet inspection and active reporting to a SOC for monitoring.

A server 575 may be set up in a data center environment behind a dedicated firewall where the VPN connection from the endpoint is terminated. A "dedicated" server is a server specifically configured to exchange information with an endpoint as described in the current application. The server may be hardened to current STIG requirements. The server may have IPTables configured to only accept connections from the IP addresses assigned to each specific endpoint and the SSH port. The server may comprise an ID verification module configured to restrict communications to only between the server and the individual previously approved endpoint. The sever may be plugged into or connected to a locally managed network switch using a dedicated network interface on the sever. The network interface on the sever may be configured utilizing local TCP/IP (v4 or v6) IP address assignment. The network interface may comprise an up state and a down state. A separate file system may be established on the server for each endpoints. The file system may be configured to function as a "quarantine zone 577" for each endpoint. Each endpoint may be able to securely copy data or files to the quarantine zone. A separate file system may be configured so that the server functions as a "distribution zone 579." The endpoints may be configured securely copy file from the server distribution zone. The distribution zone and quarantine zone may be separate file systems and the distribution zone may be limited to read only. Files placed in the distribution zone may be encrypted and digitally signed. The server may comprise a separate file system that functions as a "quarantined red zone." Endpoints may be configured to securely copy files from the quarantined red zone. The file system of the quarantined red zone may be separate from the "quarantine zone" and may be limited to read only. Files placed in the quarantine zone file system may be encrypted via an encryption module. Files place in the quarantine zone file system may be digitally signed. The server may comprise a SSH server. The SSH might be configured to use a nonstandard port. A security key module may generate a unique public/private key pair for the SCP for each endpoint. The security key module may place the public key on the server and the private key on the individual endpoint.

The quarantine zone is a location on the server to initially receive files from the endpoint. The server may scan files for malware in this location. If no malware is detected by server, the sever may move the file to a next location for further processing. If the file contains malware (or is suspected to contain malware), the server may be configured to move the file to the red quarantine zone (e.g., a permanent quarantine). The server may perform cyber forensic analysis on files in the red quarantine zone and/or permanently remove/delete from the data storage of the server. Through this process, the server is configured to avoid keeping harmful files in the drop zone (quarantine zone), while still be capable of placing new files from the end points in the quarantine zone for malware scanning.

Scheduled OT Data Exchange

Figure 6:
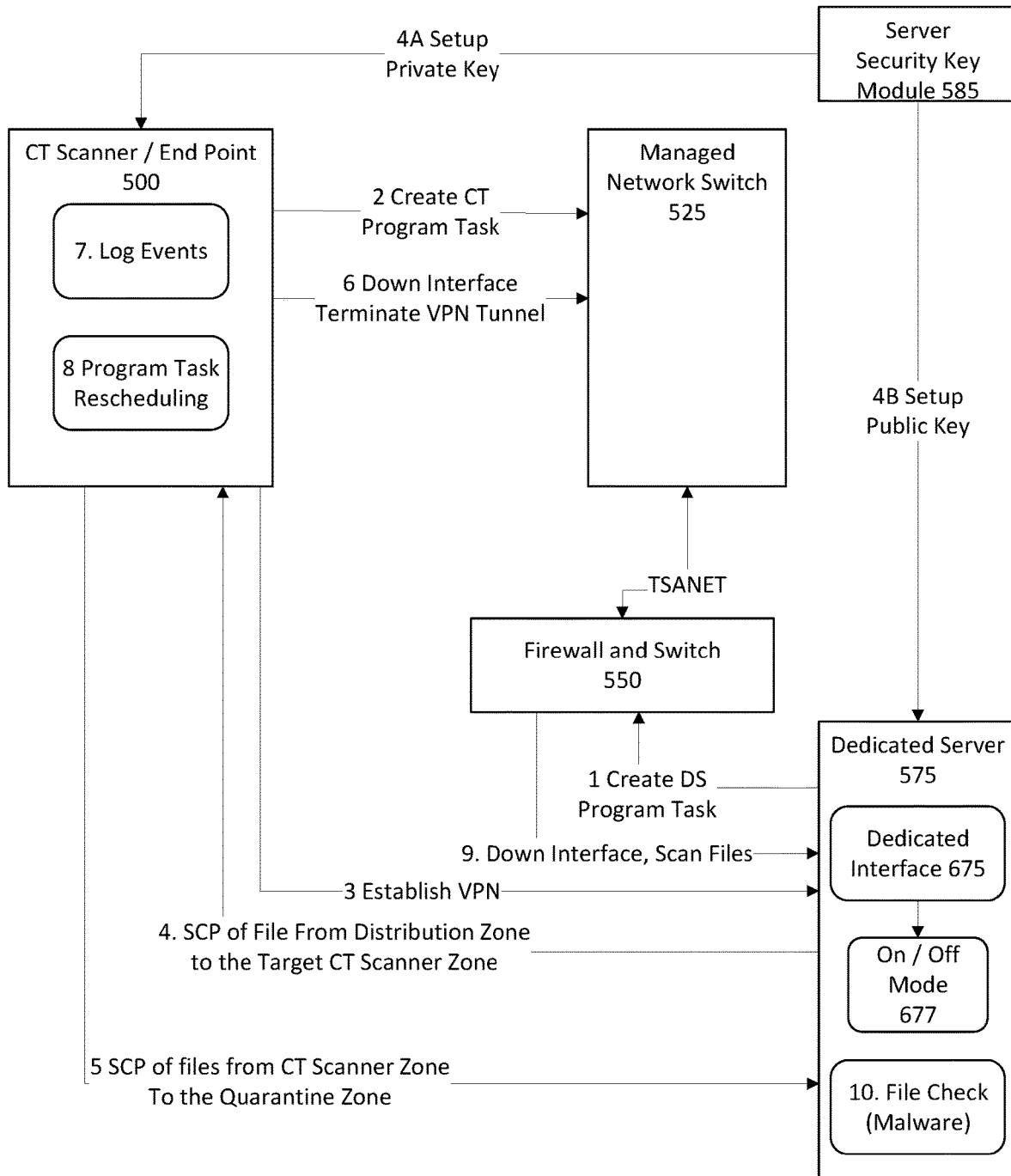
FIG. 6 shows a connection process between an endpoint and a server.

FIG. 6 illustrates a process flow for securely exchanging information between a dedicated server 575 and CT scanner/endpoint(s) 500A-500C. The steps may be performed in the sequence presented, steps may be implemented at the same time, or they may be performed in alternate order.

Step 1) The server may create a program task or a "cron job" in the DS server. Cron is a utility program that lets users input commands for scheduling tasks repeatedly at a specific time. Tasks scheduled in cron are called cron jobs. Users can determine what kind of task they want to automate and when it should be executed. Cron is a daemon—a background process executing non-interactive jobs. Microsoft Windows contains background processes called Services that work similarly to the cron daemon. A cron file is a simple text file that contains commands to run periodically at a specific time. With cron jobs, users can automate system maintenance, disk space monitoring, and schedule backups.

The server may comprise a dedicated network interface configured to send and receive information from the firewall and switch 550. The server program task may set the dedicated network interface into an "up state" for a predetermined amount of time and specific time window. E.g., for 3 hours between 0100 and 0400. After the time window has lapsed, the program task may be set the dedicated interface to a "down state." As shown, the dedicated server 575 may comprise dedicated interface 675 with an online/offline mode 677.

Step 2) The CT Scanner/Endpoint may also be configured to create a program task on each CT scanner. The CT Scanner/Endpoint may also comprise a dedicated network interface. The endpoint program task may be configured to run every 24 hours during a random time between the pre-determined times as configured on the server less the necessary amount of time for the SCP commands to execute and as seeded by the random number generator of the endpoint. E.g., if SCP will take 10 min to run, the program task might start at 0315 on the endpoint. For example, the program task might be configured to run between 0100 and 0400 and end before 0400 when the endpoint interface will change to a "down" state. In this way, a "transfer window" is created for a period of time when the server is online and available to transfer files between the individual endpoints.

Step 3) Once the endpoint program task has changed the dedicated interface to the "up state", the endpoint may be configured to establish an encrypted VPN between the CT scanner and the DS.

Step 4) The endpoint may be configured to transfer information on a nonstandard port. A security key module 585 may be configured to setup a public/private key pair. The security key module 585 may install the private key on the CT Scanner 500 and the public key on the Dedicated Server. Once the encrypted VPN is established, the CT scanner may execute the SCP command on a nonstandard port with the previously installed public/private key pair to copy the files in the "distribution zone" (e.g., the DHS CA CRL) from the DS to the CT scanner.

Step 5) Once the CT Scanner has copied files from the "distribution zone" of the server, the CT scanner may execute a SCP command on the nonstandard port defined with the previously installed public/private key pair to copy any necessary files up to the server "quarantine zone" for that specific endpoint. The endpoint may encrypt these files before they are uploaded.

Step 6) The CT Scanner may be configured to send the files via SCP to the server. The program task on the individual endpoint may be configured to place the dedicated network interface into a "down state." The program task may check the downloaded files for required signatures. If the program task determines the signatures are valid, then the endpoint may be configured to decrypt the files and place the files into a designed endpoint file systems for future processing.

Step 7) If the individual endpoint is unable to connect to the server or execute the SCP commands for any reason, the endpoint may be configured to generate an error message to store in a local log file. A trouble shooting module may be configured to analyze the error message/log file to determine a source of the connection problem/SCP command failure. As an exemplary method, the endpoint may fail to connect to the server; the endpoint may generate an error message; the endpoint may log the error message into a local log file; the endpoint may execute a trouble shooting module to analyze a source the error message; and the trouble shooting module may restoring the connection between the endpoint and the server.

Step 8) The program task of the endpoint may be configured to re-schedule itself to: a) run based on a random time or retry the program task if the task failed on the same day.

Step 9) For files uploaded from the individual endpoint to the server, a separate program task may be configured to execute after the "transfer window" has closed. The separate cron program task may be configured to process files that have been uploaded to the "quarantine zone" of the server. The files may be scanned and scrubbed/cleaned and determined to be malware free before being the program task will move the files to another file system on the server or other server for additional processing.

Step 10) When the virus scanner determines that the uploaded file(s) are not malware free, the virus scanner may be moved the files to another quarantine file system for forensic analysis. The virus scanner may generate an error log message indicating that a file with malware was identified. The virus scanner may update the IPTables to disallow that specific endpoint from connecting to the server again until the malware issue has been resolved.

Endpoint and Server Information Process Flow

Figure 7:
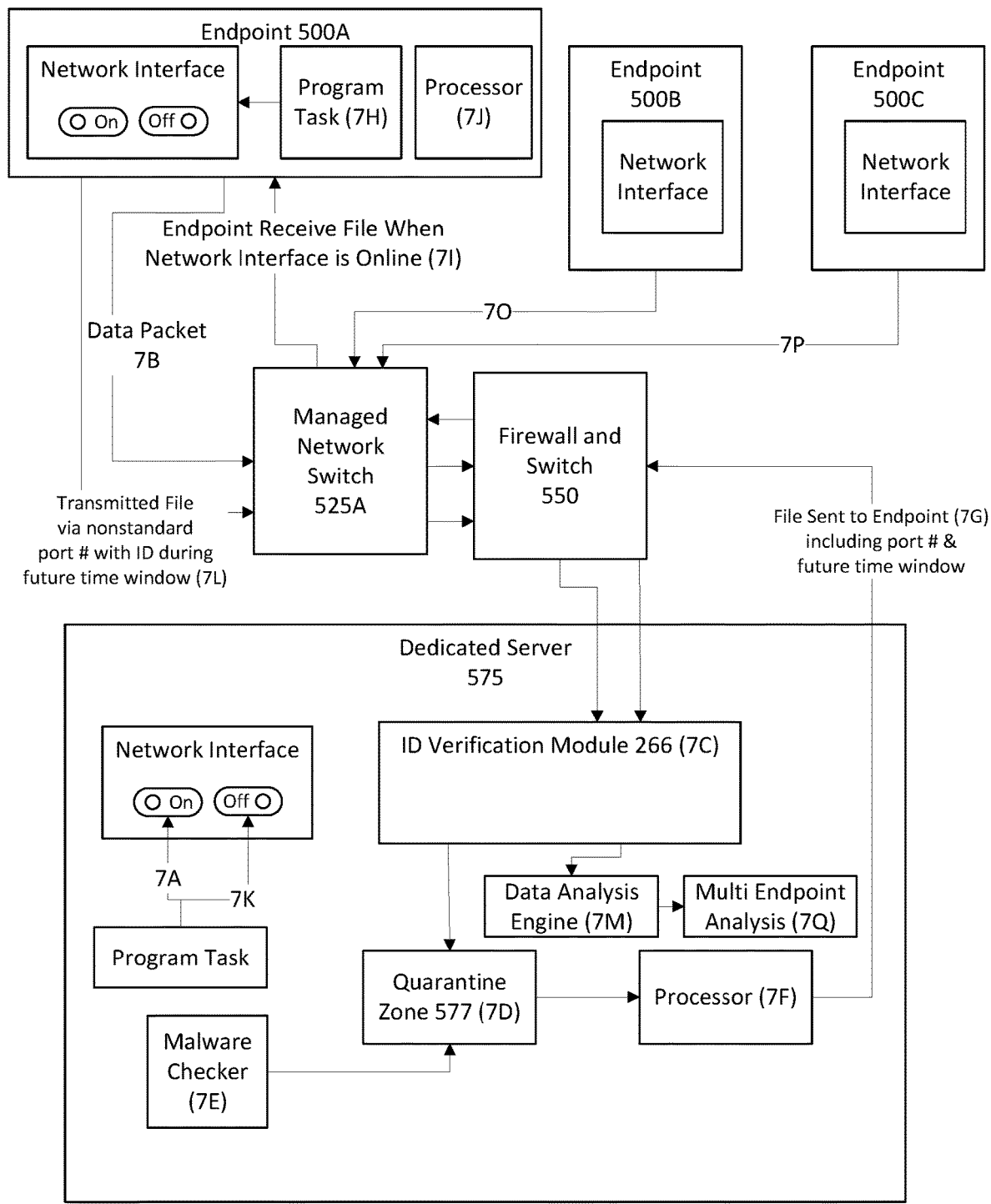
FIG. 7 is another view of a secure information transfer process between an endpoint and a server.

FIG. 7 shows a method of securely exchanging information between a server 575 and an endpoint 500A. As discussed with reference to the previous figures, the server may comprise a processor, memory, storage media, a network interface, and non-transitory software instructions configured to executed by the processor. The endpoint may comprise a processor, memory, storage media, a network interface and non-transitory software instructions configured to executed by the processor. The processor of the server may create a program task in the memory of the server.

The program task in the server may switch (7A) the network interface of the server into an online mode. The server may receive (7B) a data packet from the endpoint when the network interface of the server is in online mode; the data packet may contain an ID and instructions.

The server may verify (7C) the ID matches an ID from a list of approved IDs. The server may store instructions from the data packet in a quarantine zone (7D). A malware checker (a system or software configured to scan files for harmful files) scanning (7E) the file for malware. The server may process instructions (7F) in the file. The server may transmit (7G) a file back to the endpoint based on the instructions in the data packet. As shown, the server may transmit the file back to the endpoint through a firewall and switch 550.

A program task in the endpoint may switch (7H) the network interface of the endpoint into an online mode. The endpoint may receive (7I) the transmitted file when the network interface of the server is in online mode. The endpoint may process instructions (7J) within the transmitted file. The transmitted file may contain a nonstandard port number, a future time window, and a request for scan information.

The program task of server may turn off (7K) the network interface after the server transmits the file back to the endpoint. The program task of the server may turn back on the network interface at a beginning of the future time window. The endpoint may send (7L) scan information to the server using a nonstandard port number, within a time specified by the future time window. A data analysis engine in the server may perform data analysis (7M) on the scan information may determine patterns of scan information. The server may receive scan information from a second endpoint (7O) and third endpoint (7P). The server may perform data analysis on the scan information from the endpoint, second endpoint, and third endpoint to determine patterns of scan information.

Hardware Configurations

The server, hub, and endpoint may include a hardware processor communicatively coupled to an instruction memory and to a data memory by a bus. The instruction memory can be configured to store, on at least a non-transitory computer readable medium as described in greater detail below, executable program code. The hardware processor may include multiple hardware processors and/or multiple processor cores. The hardware processor may include cooperation with hardware processors from different devices. The server, hub, and endpoint may execute one or more basic instructions included in the executable program code. The server, hub, and endpoint can include a network interface communicatively connected to the bus, for interfacing to a wide area network (WAN), e.g., the Internet or a private area network. Also communicatively connected to the bus can be a GUI. The server, hub, and endpoint may also include a mass storage, which can be accessible to the hardware processor via the bus.

The relationship between the executable program code and the hardware processor is structural; the executable program code is provided to the hardware processor by imparting various voltages at certain times across certain electrical connections, in accordance with binary values in the executable program code, to cause the hardware processor to perform some action, as now explained in more detail.

A hardware processor may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. The hardware processor interprets the voltages as binary values.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONCLUSION

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it will be understood that the subject matter defined in the appended claims is not necessarily limited to the specific features or steps described. Rather, the specific features and steps are disclosed as example forms of implementing the claimed subject matter. To the extent headings appear in this description, they are for the convenience of the reader, not as limitations or restrictions of the systems, techniques, approaches, methods, or devices to those appearing in any section. Rather, the teachings and disclosures herein can be combined or rearranged with other portions of this disclosure and the knowledge of one of ordinary skill in the art. This disclosure generally encompasses and includes such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application-specific integrated circuit, or that may cause a computer (e.g., a general-purpose computer) executing the instructions to have defined characteristics. There may be a combination of hardware and software such as processor implementing firmware, software, and so forth, to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, structures for a module a module can be according to the module's function or set of functions, e.g., in accordance with a described algorithm. This disclosure may use nomenclature that associates a component or module with a function, purpose, step, or sub-step to identify the corresponding structure which, in instances, includes hardware and/or software that function for a specific purpose.

Titles and heading used throughout the specification are provided for navigational purposes only. They should not be considered as limiting or defining of the subject matter disclosed. Paragraphs and sections relevant to one figure or embodiment may be equally relevant to another figure.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

| Table of Acronyms | |
|---|---|
| Acronym | Definition |
| AIT | Advanced Imaging Technology |
| CA | Certificate Authority |
| CDM | Continuous Data Monitoring |
| CISCO | Cisco Systems |
| CPU | Central Processing Unit |
| CRL | Certificate Revocation List |
| CT | Computerized Tomography |
| DICOS | Digital Imaging and Communication in Security |
| DHS | Department of Homeland Security |
| DS | Dedicated Server |
| ETL | Extract Transform Load |
| FDRS | Field Data Recording Service |
| GMT | Greenwich Mean Time |
| ICAF | Integrated Checkpoint Architecture Framework |
| IP | Internet Protocol |
| ISE | Identity Services Engine |
| OEM | Original Equipment Manufacturer |
| OS | Operating System |
| OT | Operation Technology |
| MAC | Media Access Control |
| PIV | Personal Identity Verification |
| SCP | Secure Copy Protocol |
| SOC | Security Operations Center |
| SSH | Secure Socket Shell |
| STIG | Security Technical Implementation Guides |
| TCP/IP Protocol | Transmission Control Protocol/Internet Protocol |
| TIP | Threat Image Projection |
| TSA | Transportation Security Administration |
| TSE | Transportation Security Equipment |
| USB | Universal Serial Bus |
| VPN | Virtual Private Network |

| Table of Standard Ports | | | |
|---|---|---|---|
| Port | TCP | UDP | Description |
| 0 | | Reserved | In programming APIs (not in communication between hosts), requests a system-allocated (dynamic) port |
| 1 | Yes | Assigned | TCP Port Service Multiplexer (TCPMUX). Historic. Both TCP and UDP have been assigned to TCPMUX by IANA, but by design only TCP is specified. |
| 2 | | Assigned | compressnet (Management Utility) |
| 3 | | Assigned | compressnet (Compression Process) |
| 5 | | Assigned | Remote Job Entry was historically using socket 5 in its old socket form, while MIB PIM has identified it as TCP/5 and IANA has assigned both TCP and UDP 5 to it. |
| 7 | | Yes | Echo Protocol |
| 9 | | Yes | Discard Protocol |
| | No | Unofficial | Wake-on-LAN |
| 11 | | Yes | Active Users (systat service) |
| 13 | | Yes | Daytime Protocol |
| 15 | Unofficial | No | Previously netstat service |
| 17 | | Yes | Quote of the Day (QOTD) |
| 18 | | Yes | Message Send Protocol |
| 19 | | Yes | Character Generator Protocol (CHARGEN) |
| 20 | Yes | Assigned | File Transfer Protocol (FTP) data transfer |
| 21 | Yes | Assigned | File Transfer Protocol (FTP) control (command) |
| 22 | Yes | Assigned | Secure Shell (SSH), secure logins, file transfers (scp, sftp) and port forwarding |
| 23 | Yes | Assigned | Telnet protocol-unencrypted text communications |
| 25 | Yes | Assigned | Simple Mail Transfer Protocol (SMTP), used for email routing between mail servers |
| 27 | | Assigned | nsw-fe (NSW User System FE) |
| 28 | Unofficial | | Palo Alto Networks' Panorama High Availability (HA) sync encrypted port. |
| 29 | | Assigned | msg-icp (MSG ICP) |
| 31 | | Assigned | msg-auth (MSG Authentication) |
| 33 | | Assigned | dsp (Display Support Protocol) |
| 37 | | Yes | Time Protocol |
| 38 | | Assigned | rap (Route Access Protocol) |
| 39 | | Assigned | rlp (Resource Location Protocol) |
| 41 | | Assigned | graphics (Graphics) |
| 42 | Assigned | Yes | Host Name Server Protocol |
| 43 | Yes | Assigned | WHOIS protocol |
| 44 | | Assigned | mpm-flags (MPM FLAGS Protocol) |
| 45 | | Assigned | mpm (Message Processing Module) |
| 46 | | Assigned | mpm-snd (MPM) |
| 47 | | Reserved | |
| 48 | | Assigned | auditd (Digital Audit Daemon) |
| 49 | | Yes | TACACS Login Host protocol. TACACS+, still in draft which is an improved but distinct version of TACACS, only uses TCP 49. |

-continued

Table of Standard Ports

| Port | TCP | UDP | Description |
|---|---|---|---|
| 50 | | Assigned | re-mail-ck (Remote Mail Checking Protocol) |
| 51 | | Reserved | Historically used for Interface Message Processor logical address management, entry has been removed by IANA on 2013 May 25 |
| 52 | | Assigned | Xerox Network Systems (XNS) Time Protocol. Despite this port being assigned by IANA, the service is meant to work on SPP (ancestor of IPX/SPX), instead of TCP/IP. |
| 53 | | Yes | Domain Name System (DNS) |
| 54 | | Assigned | Xerox Network Systems (XNS) Clearinghouse (Name Server). Despite this port being assigned by IANA, the service is meant to work on SPP (ancestor of IPX/SPX), instead of TCP/IP. |
| 55 | | Assigned | isi-gl (ISI Graphics Language) |
| 56 | | Assigned | Xerox Network Systems (XNS) Authentication Protocol. Despite this port being assigned by IANA, the service is meant to work on SPP (ancestor of IPX/SPX), instead of TCP/IP. |
| 58 | | Assigned | Xerox Network Systems (XNS) Mail. Despite this port being assigned by IANA, the service is meant to work on SPP (ancestor of IPX/SPX), instead of TCP/IP. |
| 61 | | Reserved | Historically assigned to the NIFTP-Based Mail protocol, but was never documented in the related IEN. The port number entry was removed from IANA's registry on 2017 May 18. |
| 62 | | Assigned | acas (ACA Services) |
| 63 | | Assigned | whoispp (whois++) |
| 64 | | Assigned | covia (Communications Integrator (CI)) |
| 65 | | Assigned | tacacs-ds (TACACS-Database Service) |
| 66 | | Assigned | sql-net (Oracle SQL*NET) |
| 67 | Assigned | Yes | Bootstrap Protocol (BOOTP) server; also used by Dynamic Host Configuration Protocol (DHCP) |
| 68 | Assigned | Yes | Bootstrap Protocol (BOOTP) client; also used by Dynamic Host Configuration Protocol (DHCP) |
| 69 | Assigned | Yes | Trivial File Transfer Protocol (TFTP) |
| 70 | Yes | Assigned | Gopher protocol |
| 71-74 | | Yes | NETRJS protocol |
| 76 | | Assigned | deos (Distributed External Object Store) |
| 78 | | Assigned | vettcp (vettcp) |
| 79 | Yes | Assigned | Finger protocol |
| 80 | | Yes | Hypertext Transfer Protocol (HTTP) uses TCP in versions 1.x and 2. HTTP/3 uses QUIC, a transport protocol on top of UDP. |
| 81 | Unofficial | | TorPark onion routing |
| 82 | | Assigned | xfer (XFER Utility) |
| 82 | | Unofficial | TorPark control |
| 83 | | Assigned | mit-ml-dev (MIT ML Device) |
| 84 | | Assigned | ctf (Common Trace Facility) |
| 85 | | Assigned | mit-ml-dev (MIT ML Device) |
| 86 | | Assigned | mfcobol (Micro Focus Cobol) |
| 88 | | Yes | Kerberos authentication system |
| 89 | | Assigned | su-mit-tg (SU/MIT Telnet Gateway) |
| 90 | | Assigned | dnsix (DNSIX Security Attribute Token Map) |
| 90 | | Unofficial | PointCast (dotcom) |
| 91 | | Assigned | mit-dov (MIT Dover Spooler) |
| 92 | | Assigned | npp (Network Printing Protocol) |
| 93 | | Assigned | dcp (Device Control Protocol) |
| 94 | | Assigned | objcall (Tivoli Object Dispatcher) |
| 95 | Yes | Assigned | SUPDUP, terminal-independent remote login |
| 96 | | Assigned | dixie (DIXIE Protocol Specification) |
| 97 | | Assigned | swift-rvf (Swift Remote Virtual File Protocol) |
| 98 | | Assigned | tacnews (TAC News) |
| 99 | | Assigned | metagram (Metagram Relay) |
| 101 | Yes | Assigned | NIC host name |
| 102 | Yes | Assigned | ISO Transport Service Access Point (TSAP) Class 0 protocol; |
| 104 | | Yes | Digital Imaging and Communications in Medicine (DICOM; also port 11112) |
| 105 | | Yes | CCSO Nameserver |
| 106 | Unofficial | No | macOS Server, (macOS) password server |
| 107 | | Yes | Remote User Telnet Service (RTelnet) |
| 108 | | Yes | IBM Systems Network Architecture (SNA) gateway access server |
| 109 | Yes | Assigned | Post Office Protocol, version 2 (POP2) |
| 110 | Yes | Assigned | Post Office Protocol, version 3 (POP3) |
| 111 | | Yes | Open Network Computing Remote Procedure Call (ONC RPC, sometimes referred to as Sun RPC) |
| 113 | Yes | No | Ident, authentication service/identification protocol, used by IRC servers to identify users |
| | Yes | Assigned | Authentication Service (auth), the predecessor to identification protocol. Used to determine a user's identity of a particular TCP connection. |
| 115 | Yes | Assigned | Simple File Transfer Protocol |

-continued

Table of Standard Ports

| Port | TCP | UDP | Description |
|---|---|---|---|
| 117 | | Yes | UUCP Mapping Project (path service) |
| 118 | | Yes | Structured Query Language (SQL) Services |
| 119 | Yes | Assigned | Network News Transfer Protocol (NNTP), retrieval of newsgroup messages |
| 123 | Assigned | Yes | Network Time Protocol (NTP), used for time synchronization |
| 126 | | Yes | Formerly Unisys Unitary Login, renamed by Unisys to NXEdit. Used by Unisys Programmer's Workbench for Clearpath MCP, an IDE for Unisys MCP software development |
| 135 | | Yes | DCE endpoint resolution |
| | | Yes | Microsoft EPMAP (End Point Mapper), also known as DCE/RPC Locator service, used to remotely manage services including DHCP server, DNS server and WINS. Also used by DCOM |
| 137 | | Yes | NetBIOS Name Service, used for name registration and resolution |
| 138 | Assigned | Yes | NetBIOS Datagram Service |
| 139 | Yes | Assigned | NetBIOS Session Service |
| 143 | Yes | Assigned | Internet Message Access Protocol (IMAP), management of electronic mail messages on a server |
| 151 | | Assigned | HEMS |
| 152 | | Yes | Background File Transfer Program (BFTP) |
| 153 | | Yes | Simple Gateway Monitoring Protocol (SGMP), a protocol for remote inspection and alteration of gateway management information |
| 156 | | Yes | Structured Query Language (SQL) Service |
| 158 | | Yes | Distributed Mail System Protocol (DMSP, sometimes referred to as Pcmail) |
| 161 | Assigned | Yes | Simple Network Management Protocol (SNMP) |
| 162 | | Yes | Simple Network Management Protocol Trap (SNMPTRAP) |
| 165 | | Assigned | Xerox |
| 169 | | Assigned | SEND |
| 170 | | Yes | Network PostScript print server |
| 177 | | Yes | X Display Manager Control Protocol (XDMCP), used for remote logins to an X Display Manager server |
| 179 | Yes | Assigned | Border Gateway Protocol (BGP), used to exchange routing and reachability information among autonomous systems (AS) on the Internet |
| 180 | | Assigned | ris |
| 194 | | Yes | Internet Relay Chat (IRC) |
| 199 | | Yes | SNMP Unix Multiplexer (SMUX) |
| 201 | | Yes | AppleTalk Routing Maintenance |
| 209 | Yes | Assigned | Quick Mail Transfer Protocol |
| 210 | | Yes | ANSI Z39.50 |
| 213 | | Yes | Internetwork Packet Exchange (IPX) |
| 218 | | Yes | Message posting protocol (MPP) |
| 220 | | Yes | Internet Message Access Protocol (IMAP), version 3 |
| 225-241 | | Reserved | |
| 249-255 | | Reserved | |
| 259 | | Yes | Efficient Short Remote Operations (ESRO) |
| 262 | | Yes | Arcisdms |
| 264 | | Yes | Border Gateway Multicast Protocol (BGMP) |
| 280 | | Yes | http-mgmt |
| 300 | Unofficial | | ThinLinc Web Access |
| 308 | Yes | | Novastor Online Backup |
| 311 | Yes | Assigned | macOS Server Admin (officially AppleShare IP Web administration) |
| 312 | Unofficial | No | macOS Xsan administration |
| 318 | | Yes | PKIX Time Stamp Protocol (TSP) |
| 319 | | Yes | Precision Time Protocol (PTP) event messages |
| 320 | | Yes | Precision Time Protocol (PTP) general messages |
| 350 | | Yes | Mapping of Airline Traffic over Internet Protocol (MATIP) type A |
| 351 | | Yes | MATIP type B |
| 356 | | Yes | cloanto-net-1 (used by Cloanto Amiga Explorer and VMs) |
| 366 | | Yes | On-Demand Mail Relay (ODMR) |
| 369 | | Yes | Rpc2portmap |
| 370 | | Yes | codaauth2, Coda authentication server |
| | | Yes | securecast1, outgoing packets to NAI's SecureCast serversAs of 2000 |
| 371 | | Yes | ClearCase albd |
| 376 | | Yes | Amiga Envoy Network Inquiry Protocol |
| 383 | | Yes | HP data alarm manager |
| 384 | | Yes | A Remote Network Server System |
| 387 | | Yes | AURP (AppleTalk Update-based Routing Protocol) |
| 388 | Yes | Assigned | Unidata LDM near real-time data distribution protocol |
| 389 | Yes | Assigned | Lightweight Directory Access Protocol (LDAP) |
| 399 | | Yes | Digital Equipment Corporation DECnet+ (Phase V) over TCP/IP (RFC1859) |
| 401 | | Yes | Uninterruptible power supply (UPS) |
| 427 | | Yes | Service Location Protocol (SLP) |
| 433 | | Yes | NNTP, part of Network News Transfer Protocol |

-continued

Table of Standard Ports

| Port | TCP | UDP | Description |
|---|---|---|---|
| 434 | | Yes | Mobile IP Agent (RFC 5944) |
| 443 | | Yes | Hypertext Transfer Protocol Secure (HTTPS) uses TCP in versions 1.x and 2. HTTP/3 uses QUIC, a transport protocol on top of UDP. |
| 444 | | Yes | Simple Network Paging Protocol (SNPP), RFC 1568 |
| 445 | | Yes | Microsoft-DS (Directory Services) Active Directory, Windows shares |
| | Yes | Assigned | Microsoft-DS (Directory Services) SMB file sharing |
| 464 | | Yes | Kerberos Change/Set password |
| 465 | Yes | No | SMTP over implicit SSL (obsolete) |
| | Yes | No | URL Rendezvous Directory for Cisco SSM (primary usage assignment) |
| | Yes | No | Authenticated SMTP over TLS/SSL (SMTPS) (alternative usage assignment) |
| 475 | | Yes | tcpnethaspsrv, Aladdin Knowledge Systems Hasp services |
| 476-490 | | Unofficial | Centro Software ERP ports |
| 491 | Unofficial | | GO-Global remote access and application publishing software |
| 497 | | Yes | Retrospect |
| 500 | Assigned | Yes | Internet Security Association and Key Management Protocol (ISAKMP)/Internet Key Exchange (IKE) |
| 502 | | Yes | Modbus Protocol |
| 504 | | Yes | Citadel, multiservice protocol for dedicated clients for the Citadel groupware system |
| 510 | | Yes | FirstClass Protocol (FCP), used by FirstClass client/server groupware system |
| 512 | Yes | | Rexec, Remote Process Execution |
| | | Yes | comsat, together with biff |
| 513 | Yes | | rlogin |
| | | Yes | Who |
| 514 | Unofficial | | Remote Shell, used to execute non-interactive commands on a remote system (Remote Shell, rsh, remsh) |
| | No | Yes | Syslog, used for system logging |
| 515 | Yes | Assigned | Line Printer Daemon (LPD), print service |
| 517 | | Yes | Talk |
| 518 | | Yes | NTalk |
| 520 | Yes | | efs, extended file name server |
| | | Yes | Routing Information Protocol (RIP) |
| 521 | | Yes | Routing Information Protocol Next Generation (RIPng) |
| 524 | | Yes | NetWare Core Protocol (NCP) is used for a variety things such as access to primary NetWare server resources, Time Synchronization, etc. |
| 525 | | Yes | Timed, Timeserver |
| 530 | | Yes | Remote procedure call (RPC) |
| 532 | Yes | Assigned | netnews |
| 533 | | Yes | netwall, for emergency broadcasts |
| 540 | Yes | | Unix-to-Unix Copy Protocol (UUCP) |
| 542 | | Yes | commerce (Commerce Applications) |
| 543 | Yes | | klogin, Kerberos login |
| 544 | Yes | | kshell, Kerberos Remote shell |
| 546 | | Yes | DHCPv6 client |
| 547 | | Yes | DHCPv6 server |
| 548 | Yes | Assigned | Apple Filing Protocol (AFP) over TCP |
| 550 | | Yes | new-rwho, new-who |
| 554 | | Yes | Real Time Streaming Protocol (RTSP) |
| 556 | Yes | | Remotefs, RFS, rfs_server |
| 560 | | Yes | rmonitor, Remote Monitor |
| 561 | | Yes | monitor |
| 563 | | Yes | NNTP over TLS/SSL (NNTPS) |
| 564 | Unofficial | | 9P (Plan 9) |
| 585 | | No | Previously assigned for use of Internet Message Access Protocol over TLS/SSL (IMAPS), now deregistered in favour of port 993. |
| 587 | Yes | Assigned | email message submission (SMTP) |
| 591 | Yes | | FileMaker 6.0 (and later) Web Sharing (HTTP Alternate, also see port 80) |
| 593 | | Yes | HTTP RPC Ep Map, Remote procedure call over Hypertext Transfer Protocol, often used by Distributed Component Object Model services and Microsoft Exchange Server |
| 601 | Yes | | Reliable Syslog Service - used for system logging |
| 604 | Yes | | TUNNEL profile, a protocol for BEEP peers to form an application layer tunnel |
| 623 | | Yes | ASF Remote Management and Control Protocol (ASF-RMCP) & IPMI Remote Management Protocol |
| 625 | Unofficial | No | Open Directory Proxy (ODProxy) |
| 631 | | Yes | Internet Printing Protocol (IPP) |
| | | Unofficial | Common Unix Printing System (CUPS) administration console (extension to IPP) |
| 635 | | Yes | RLZ DBase |

-continued

Table of Standard Ports

| Port | TCP | UDP | Description |
|---|---|---|---|
| 636 | Yes | Assigned | Lightweight Directory Access Protocol over TLS/SSL (LDAPS) |
| 639 | | Yes | Multicast Source Discovery Protocol, MSDP |
| 641 | | Yes | SupportSoft Nexus Remote Command (control/listening), a proxy gateway connecting remote control traffic |
| 643 | | Yes | SANity |
| 646 | | Yes | Label Distribution Protocol (LDP), a routing protocol used in MPLS networks |
| 647 | Yes | | DHCP Failover protocol |
| 648 | Yes | | Registry Registrar Protocol (RRP) |
| 651 | | Yes | IEEE-MMS |
| 653 | | Yes | SupportSoft Nexus Remote Command (data), a proxy gateway connecting remote control traffic |
| 654 | Yes | | Media Management System (MMS) Media Management Protocol (MMP) |
| 655 | | Yes | Tinc VPN daemon |
| 657 | | Yes | IBM RMC (Remote monitoring and Control) protocol, used by System p5 AIX Integrated Virtualization Manager (IVM) and Hardware Management Console to connect managed logical partitions (LPAR) to enable dynamic partition reconfiguration |
| 660 | Yes | Assigned | macOS Server administration, version 10.4 and earlier |
| 666 | | Yes | Doom, the first online first-person shooter |
| | Unofficial | | airserv-ng, aircrack-ng's server for remote-controlling wireless devices |
| 674 | Yes | | Application Configuration Access Protocol (ACAP) |
| 688 | | Yes | REALM-RUSD (ApplianceWare Server Appliance Management Protocol) |
| 690 | | Yes | Velneo Application Transfer Protocol (VATP) |
| 691 | Yes | | MS Exchange Routing |
| 694 | | Yes | Linux-HA high-availability heartbeat |
| 695 | Yes | | IEEE Media Management System over SSL (IEEE-MMS-SSL) |
| 698 | | Yes | Optimized Link State Routing (OLSR) |
| 700 | Yes | | Extensible Provisioning Protocol (EPP), a protocol for communication between domain name registries and registrars (RFC 5734) |
| 701 | Yes | | Link Management Protocol (LMP), a protocol that runs between a pair of nodes and is used to manage traffic engineering (TE) links |
| 702 | Yes | | IRIS (Internet Registry Information Service) over BEEP (Blocks Extensible Exchange Protocol) (RFC 3983) |
| 706 | Yes | | Secure Internet Live Conferencing (SILC) |
| 711 | Yes | | Cisco Tag Distribution Protocol-being replaced by the MPLS Label Distribution Protocol |
| 712 | Yes | | Topology Broadcast based on Reverse-Path Forwarding routing protocol (TBRPF; RFC 3684) |
| 749 | | Yes | Kerberos administration |
| 750 | | Yes | kerberos-iv, Kerberos version IV |
| 751 | | Unofficial | kerberos_master, Kerberos authentication |
| 752 | | Unofficial | passwd_server, Kerberos password (kpasswd) server |
| 753 | | Yes | Reverse Routing Header (RRH) |
| | | Unofficial | userreg_server, Kerberos userreg server |
| 754 | Yes | | tell send |
| | Unofficial | | krb5_prop, Kerberos v5 slave propagation |
| 760 | | Unofficial | krbupdate, Kerberos registration |
| 782 | Unofficial | | Conserver serial-console management server |
| 783 | Unofficial | | SpamAssassin spamd daemon |
| 800 | | Yes | mdbs-daemon |
| 802 | | Yes | MODBUS/TCP Security |
| 808 | Unofficial | | Microsoft Net.TCP Port Sharing Service |
| 829 | Yes | Assigned | Certificate Management Protocol |
| 830 | | Yes | NETCONF over SSH |
| 831 | | Yes | NETCONF over BEEP |
| 832 | | Yes | NETCONF for SOAP over HTTPS |
| 833 | | Yes | NETCONF for SOAP over BEEP |
| 843 | Unofficial | | Adobe Flash |
| 847 | Yes | | DHCP Failover protocol |
| 848 | | Yes | Group Domain Of Interpretation (GDOI) protocol |
| 853 | Yes | | DNS over TLS (RFC 7858) |
| | | Yes | DNS over QUIC or DNS over DTLS |
| 860 | Yes | | iSCSI (RFC 3720) |
| 861 | | Yes | OWAMP control (RFC 4656) |
| 862 | | Yes | TWAMP control (RFC 5357) |
| 873 | Yes | | rsync file synchronization protocol |
| 888 | Unofficial | | cddbp, CD DataBase (CDDB) protocol (CDDBP) |
| | Unofficial | | IBM Endpoint Manager Remote Control |
| 897 | | Unofficial | Brocade SMI-S RPC |
| 898 | | Unofficial | Brocade SMI-S RPC SSL |

-continued

Table of Standard Ports

| Port | TCP | UDP | Description |
|---|---|---|---|
| 902 | | Unofficial | VMware ESXi |
| 903 | Unofficial | | VMware ESXi |
| 953 | Yes | Reserved | BIND remote name daemon control (RNDC) |
| 981 | Unofficial | | Remote HTTPS management for firewall devices running embedded Check Point VPN-1 software |
| 987 | | Unofficial | Sony PlayStation Wake On Lan |
| | Unofficial | | Microsoft Remote Web Workplace, a feature of Windows Small Business Server |
| 988 | Unofficial | | Lustre (file system) Protocol (data). |
| 989 | | Yes | FTPS Protocol (data), FTP over TLS/SSL |
| 990 | | Yes | FTPS Protocol (control), FTP over TLS/SSL |
| 991 | | Yes | Netnews Administration System (NAS) |
| 992 | | Yes | Telnet protocol over TLS/SSL |
| 993 | Yes | Assigned | Internet Message Access Protocol over TLS/SSL (IMAPS) |
| 994 | | Reserved | Previously assigned to Internet Relay Chat over TLS/SSL (IRCS), but was not used in common practice. |
| 995 | | Yes | Post Office Protocol 3 over TLS/SSL (POP3S) |
| 1010 | Unofficial | | ThinLinc web-based administration interface |
| 1011-1020 | | Reserved | |
| 1023 | | Reserved | |
| | | Unofficial | z/OS Network File System (NFS) (potentially ports 991-1023) |

The claimed invention is:

1. A system comprising a server configured to send a connection packet to an endpoint to establish communications at a future time through a network; the connection packet comprising a next IP address, a next IP Port, a next connection time, and a next connection date; the connection packet providing instructions to the endpoint as to when and how to send information from the endpoint to the server; the server comprising a network interface to connect the server to the network; the server comprising a processor, memory, tangible computer readable storage media, and non-transitory computer readable software configured to cause the processor to execute a series of steps;
further comprising: a time transfer window generator configured to generate a time transfer window comprising a date, start time and end time; the time transfer window comprising a default duration; and
a scheduling monitor configured to adjust the time transfer window based on how many endpoints are scheduled to send data packets;
the scheduling monitor lengthening the time transfer window when it determines there has been an increase in size or number of recently received data packets;
the scheduling monitor shortening the time transfer window when it determines there has been a decrease in size or number of recently received data packets.

2. The system of claim 1 comprising a firewall and switch configured to turn off the network interface until the next connection time and date; the firewall and switch configured to keep all other ports on the network interface closed except the next IP port.

3. The system of claim 1 comprising:
a scheduled task configured to turn off the network interface until the next connection time and date; and
a firewall and switch configured to keep all other ports on the network interface closed except the next IP port.

4. The system of claim 1 comprising:
an identity generator configured to generate an endpoint identity using an IP address, Mac Address, passcode, username and password, or a hardware key associated with the endpoint; and an ID verification module configured to:
accept communications from endpoints that an approved identity generated by the identity generator;
delete, quarantine, or export data from an endpoint that fails an ID verification; and
trigger an alarm if an ID Verification fails.

5. The system of claim 1 wherein the endpoint comprises a data compressor configured to compress data transmitted to the server.

6. The system of claim 1 wherein the time transfer window generator is configured to randomly generate the transfer window for each endpoint associated with the network.

7. The system of claim 1 wherein the time transfer window generator is configured to generate a time window to be open just long enough to securely upload and download the data packets from the endpoint.

8. The system of claim 7, wherein the server is configured to receive information on a rotating, nonstandard SSH communications port.

9. A method comprising:
generating an ID associated with an endpoint;
a data packet generator generating a data packet;
the endpoint sending a data packet at time T using port X with the ID;
a network interface switching into an active state during a time transfer window;
the network interface receiving the ID and data packet while in the active state;
the network interface providing an ID verification module with the data packet and ID; and
the ID verification module:
determining the endpoint is recognized or approved; and
confirming the ID matches an entry on a whitelist of approved identities;
further a scheduling monitor adjusting the time transfer window based on how many endpoints are scheduled to send data packets;
the scheduling monitor lengthening the time transfer window when it determines there has been an increase in size or number of recently received data packets;

the scheduling monitor shortening the time transfer window when it determines there has been a decrease in size or number of recently received data packets.

10. The method of claim 9 comprising:

the ID verification module determining the endpoint is not recognized or not approved by confirming the ID does not match an entry on a whitelist of approved identities; and the ID verification module determining the endpoint is not recognized or not approved by confirming the identity matches an entry on a blacklist of disapproved identities.

11. The method of claim 9 wherein the data packet contains data collected by the endpoint including scans, detections, anomalies, software version numbers, and operating conditions.

12. The method of claim 11 comprising a data converter converting data from the data packet into a universal format; the data converter homogenizing data from a plurality of endpoints so that the data is in a consistent format.

13. The method of claim 12 comprising:

a server storing the data from the data converter into a storage device;

a data analyzer analyzing the homogenized data for objects of interest, notifications, and detections;

a report module outputting results from the data analyzer into a report; and the report module outputting the report onto a display of a monitor or emailing a report to a user.

14. The method of claim 9 comprising:

a server transmitting a reply back to the endpoint containing a next contact time U and a next contact port Y;

the endpoint receiving the reply; and the reply programming a scheduling module in the endpoint to send a second data packet at time U using port Y.

15. The method of claim 14 comprising:

the server transmitting a second reply to the endpoint containing a next contact time V and a next contact port Z;

the endpoint receiving the second reply; and the second reply programming the scheduling module in the endpoint to send a third data packet at time V using port Z.

\* \* \* \* \*